US010268667B1

(12) United States Patent
Pachikov et al.

(10) Patent No.: US 10,268,667 B1
(45) Date of Patent: Apr. 23, 2019

(54) CONTEXTUAL OPTIMIZATION OF NEWS STREAMS ASSOCIATED WITH CONTENT ENTRY

(71) Applicant: Evernote Corporation, Redwood City, CA (US)

(72) Inventors: Alex Pachikov, Mountain View, CA (US); Phil Libin, San Jose, CA (US); Zeesha Currimbhoy, Mountain View, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 0 days.

(21) Appl. No.: 14/803,175

(22) Filed: Jul. 20, 2015

Related U.S. Application Data

(60) Provisional application No. 62/027,906, filed on Jul. 23, 2014.

(51) Int. Cl.
*G06F 17/20* (2006.01)
*G06F 17/24* (2006.01)
*G06F 17/30* (2006.01)
*G06F 3/0482* (2013.01)
*G06F 3/0484* (2013.01)

(52) U.S. Cl.
CPC ............ *G06F 17/24* (2013.01); *G06F 3/0482* (2013.01); *G06F 3/04842* (2013.01); *G06F 17/30011* (2013.01); *G06F 17/3053* (2013.01)

(58) Field of Classification Search
CPC .............. G06F 3/0486; G06F 17/30–17/30997
See application file for complete search history.

(56) References Cited

U.S. PATENT DOCUMENTS

| 6,247,010 | B1* | 6/2001 | Doi .................. G06F 17/30699 715/210 |
| 2005/0071319 | A1* | 3/2005 | Kelley .............. G06F 17/30663 |
| 2008/0172364 | A1* | 7/2008 | Cucerzan ............ G06F 17/3061 |
| 2012/0317097 | A1* | 12/2012 | Tseng ................. G06F 17/30864 707/722 |
| 2013/0159306 | A1* | 6/2013 | Janssen, Jr. ....... G06F 17/30734 707/737 |
| 2013/0318063 | A1* | 11/2013 | Ayzenshtat ....... G06F 17/30864 707/707 |
| 2014/0278556 | A1* | 9/2014 | Goltra .................... G06Q 50/24 705/3 |
| 2016/0267179 | A1* | 9/2016 | Mei ................... G06F 17/30837 |

* cited by examiner

*Primary Examiner* — Keith D Bloomquist
(74) *Attorney, Agent, or Firm* — Morgan, Lewis & Bockius LLP (57) ABSTRACT

Modifying a document being entered by a user by adding data from at least one of a plurality of news items relevant to the document includes determining other documents in a collection of documents that are relevant to the document being entered by the user, constructing a filter based on content of the document being entered by the user and on the other documents, presenting on a display the plurality of news items selected from a plurality of news feeds according to the filter, the user selecting from the display at least one of the news items, and the user inserting data from the at least one of the news items into the document. The document may be a note and the collection of documents may be a notebook. The note and the notebook may be provided by the OneNote product from Microsoft Corporation and/or by the Evernote product.

30 Claims, 6 Drawing Sheets

CONTEXTUAL OPTIMIZATION OF NEWS STREAMS ASSOCIATED WITH CONTENT ENTRY

CROSS-REFERENCE TO RELATED APPLICATIONS

This application claims priority to U.S. Prov. App. No. 62/027,906, filed Jul. 23, 2014, and entitled "CONTEXTUAL OPTIMIZATION AND INLINE CLIPPING OF NEWS STREAMS ASSOCIATED WITH CONTENT ENTRY," which is incorporated by reference herein.

TECHNICAL FIELD

This application relates to the fields of information management, search and presentation of personal and shared information and more particularly to the field of retrieving and quoting related articles from a news stream associated with a dynamically entered note.

BACKGROUND OF THE INVENTION

The notion of related items is broadly used in online publishing, shopping, travel, search, and in many other web services and applications. References to related articles may help news site visitors to expand their view of an original publication or topic; lists of related goods may lead online shoppers to better product choices. Overall, the notion of relatedness has had positive impact on web experiences and user productivity.

Since the proliferation of personal and shared content collections, such as Evernote notebooks supported by the Evernote service and software developed by Evernote Corporation of Redwood City, Calif., web and document clippings are finding and increased usage in everyday productive activities. As personal content items are accumulated in such content collections (for example, in Evernote notebooks), it becomes increasingly important to account for existing materials simultaneously with making new additions to the database; this requires identifying related items previously added to the database that can be associated with new materials.

Mechanisms have been developed to retrieve related items from individual and shared content collections every time a user clips a web page or a document, conducts an online search or looks for an item in individual or shared content collections, as described in U.S. Published Patent Application No. 2013/0318063-A1 titled: "RELATED NOTES AND MULTI-LAYER SEARCH IN PERSONAL AND SHARED CONTENT", published on Nov. 28, 2013 by Ayzenshtat, et al. and incorporated by reference herein. These mechanisms take into account substantial differences between information in limited content collections accessible only by individuals, groups or organizations who have compiled the content collections, on the one hand, and social browsing history that is successfully used by search engines, e-commerce and news sites and other cloud-based services for identification of related items on public websites, on the other hand.

Contemporary work processes increasingly rely upon streams of online or local content delivered to user desktops and mobile devices. Examples of such content rich environment include news feeds, stock quotes, notifications about pre-scheduled meetings, and matching items on watch lists (goods, upcoming concerts or conferences and other items), etc. When properly delivered, displayed and used, such content streams may contribute to efficient work scheduling where attention span cycles are accounted for and productive work is mixed with periods of rest and consumption of general information.

Notwithstanding advances made in the development of personal and shared content management systems, mechanisms for identifying related items from personal and public content collections, and content streaming to user devices, an efficient use of content rich environments with external content still faces significant challenges:

- A significant portion of content in personal and shared content collections may be created via direct user input; existing methods of retrieving related content items may not sufficiently address this dynamic content entry scenario.
- In many existing applications, news feeds are delivered in their entirety or by categories (for example, by media sources and/or content aggregators) that may be set up and modified by users before any delivery is started and may not be dynamically adapted to user activities and may not have sufficient connotation with user-driven content creation process.
- Streams of external cloud-based or organization bound content may be insufficiently connected with content authoring processes and may be underserving the productivity purpose. In particular, external and local content sources and clipping workflow may not always be adapted for immediate use in content creation processes.

Accordingly, it is desirable to provide a mechanism for enhancing user productivity during direct information entry into content collections and to include streams of news and other external information, to automatically generate and modify related news items, and to improve clipping processes.

SUMMARY OF THE INVENTION

According to the system described herein, modifying a document being entered by a user by adding data from at least one of a plurality of news items relevant to the document includes determining other documents in a collection of documents that are relevant to the document being entered by the user, constructing a filter based on content of the document being entered by the user and on the other documents, presenting on a display the plurality of news items selected from a plurality of news feeds according to the filter, the user selecting from the display at least one of the news items, and the user inserting data from the at least one of the news items into the document. The document may be a note and the collection of documents may be a notebook. The note and the notebook may be provided by the OneNote product from Microsoft Corporation and/or by the Evernote product from Evernote Corporation. Determining the other documents that are relevant to the document being entered by the user may include determining relevance values based on term frequency values and inverse document frequency values for characteristics of the other documents and the document being entered. The characteristics may include a title, a body portion, and/or a tag. Relevance of a particular one of the other documents to the document being entered by the user may be a weighted sum of the relevance values for characteristics. The collection of documents may be an individual collection or a shared collection. The display may include a first pane showing content of the document being entered by the user, a second pane showing the other documents that are relevant to the document being entered by the user, and a third pane showing the items selected from news feeds. No other documents may be shown in the second pane until after stabilization of relevance values of the other documents. Stabilization of relevance values of the other documents may be determined in response to changes in relevance values becoming insignificant as the user enters additional text in the document being entered by the user. Inserting data from the at least one of the news items into the document may include selecting text from a portion of the at least one of the news items. In response to actuating a button, text that is selected from the portion of the at least one of the news items may be copied into the document as quoted text. After a predetermined amount of time, text that is selected from the portion of the at least one of the news items may be copied into the document as quoted text without further user input.

According further to the system described herein, adding a new document to a collection of documents includes determining other documents in the collection of documents that are relevant to a document being entered by the user that is independent of the new document, constructing a filter based on content of the document being entered by the user and on the other documents, presenting on a display a plurality of news items selected from a plurality of news feeds according to the filter, and the user selecting from the display at least one of the news items that is inserted into the collection as the new document.

According further to the system described herein, a non-transitory computer-readable medium contains software that modifies a document being entered by a user by adding data from at least one of a plurality of news items relevant to the document. The software includes executable code that determines other documents in a collection of documents that are relevant to the document being entered by the user, executable code that constructs a filter based on content of the document being entered by the user and on the other documents, and executable code that presents on a display the plurality of news items selected from a plurality of news feeds according to the filter, where the user selects from the display at least one of the news items and inserts data from the at least one of the news items into the document. The document may be a note and the collection of documents may be a notebook. The note and the notebook may be provided by the OneNote product from Microsoft Corporation and/or by the Evernote product from Evernote Corporation. Executable code that determines the other documents that are relevant to the document being entered by the user may determine relevance values based on term frequency values and inverse document frequency values for characteristics of the other documents and the document being entered. The characteristics may include a title, a body portion, and/or a tag. Relevance of a particular one of the other documents to the document being entered by the user may be a weighted sum of the relevance values for characteristics. The collection of documents may be an individual collection or a shared collection. The display may include a first pane showing content of the document being entered by the user, a second pane showing the other documents that are relevant to the document being entered by the user, and a third pane showing the items selected from news feeds. No other documents may be shown in the second pane until after stabilization of relevance values of the other documents. Stabilization of relevance values of the other documents may be determined in response to changes in relevance values becoming insignificant as the user enters additional text in the document being entered by the user. Executable code that inserts data from the at least one of the news items into the document may insert the data in response to the user selecting text from a portion of the at least one of the news items. In response to actuating a button, text that is selected from the portion of the at least one of the news items may be copied into the document as quoted text. After a predetermined amount of time, text that is selected from the portion of the at least one of the news items may be copied into the document as quoted text without further user input.

According further to the system described herein, a non-transitory computer readable medium contains software that adds a new document to a collection of documents. The software includes executable code that determines other documents in the collection of documents that are relevant to a document being entered by the user that is independent of the new document, executable code that constructs a filter based on content of the document being entered by the user and on the other documents, and executable code that presents on a display a plurality of news items selected from a plurality of news feeds according to the filter, wherein the user selects from the display at least one of the news items that is inserted into the collection as the new document.

The proposed system tracks user input into new content items, such as notes or documents, examines individual or shared content collection(s) to retrieve related items based on linguistic similarities between textual input and existing content items, monitors sets of related items until the related sets reach stability during dynamic content input, combines user input and related items as a context for defining a custom news stream, builds and presents to a user a custom news stream from news feeds or other online or local information sources, and allows inline clipping of quotes from selected fragments or of full content of news items directly into new content items entered by the user.

System workflow may include the following:
1. A user types in new content item into a content collection.
2. The system scans the content collection and possibly a broader set of individual or shared content collections for related content items based on multiple relevance criteria.
3. As the user enters more text or adds other input components, the set of related content items may change significantly. The system tracks the set of related items until the set sufficiently stabilizes. If the set does not stabilize, the system may wait until a sufficiently long timeout transpires, signifying that the user has completed current input, after which the system builds the set of related content items.
4. Once the system has determined that the set of related items has stabilized, the system may combine input item and the related items (with all attributes of the related items, as explained elsewhere herein) to form a dynamic filter for retrieval of related items from online or other sources, such as news product offering, shopping, event and other feeds. Mechanisms used to detect related items in external online and other feeds may be similar to mechanisms used in #2 above.
5. The system may present related items from original content collection(s) and from the news or other streams in separate panes arranged on a screen of a mobile device or desktop device of the user. The user may select a portion of a related item and the system may place the selection, upon a timeout or following a control action, such as pressing a button or making a special gesture on a touch-enabled screen, as a quote into an input item being entered by the user at that time, thus enhancing user input with information from external sources made instantly available to the user.

Each item in a content collection may include typed or clipped text, images, handwriting, embedded audio, video, and attachments in document format or in other text-based, binary or combined formats. An item may also have various parts, such as a title a body or a text extracted via OCR and handwriting recognition from images present in a content item, as well as multiple attributes: a creation and/or last update time or location, source URL(s) or other reference info in case when the content item or its portions were clipped from a webpage or other existing source, links to other items in the same or an associated content collection, links to outside resources, assigned tags, author name(s), revision history, etc.

Retrieving related items based on a dynamic user input may combine attribute-based multi-criteria similarity with filtering rules. Specifically, similarity between the input and an individual content item in a content collection may be calculated as follows:

(i) A two-dimensional criteria matrix is created. Rows and columns of the matrix may be symmetric; one dimension of the matrix describes current dynamic input, another corresponds to a content item. Each row/column corresponds to a part of a content item (or an input), such as a title, a body or an attachment; a note attribute, such as a creation or last update time/space, a source URL for a clip included in the content item, an auto-assigned or user defined tag, a list of author names, a sharing group, etc.

(ii) Similarity criteria (or relevance criteria) may be determined for a subset of cells of the criteria matrix; for example, title-title (input title vs. title of a content item), input title-item body, input body-item tags, etc. The logic behind a multi-criteria approach is that lexical similarity between parts and attributes of the dynamic input, on the one hand, and parts/attributes of a content item chosen from a content collection, on the other hand is a measure of relatedness of similar parts. Different criteria may play different roles in the overall measure of relatedness; for example, it would seem that close resemblance of titles of an input and a content item may play a more significant role than a resemblance of an input title to a body of the same content item. Accordingly, each chosen similarity criterion may be assigned a priority or a numeric weight.

Similarity (relevance) criteria may not necessarily form a symmetric set of cells of the criteria matrix. For example, while two cells of the criteria matrix input title-item tags or input body-item image text may represent a pair of valid criteria, the symmetric cells input tags-item title and input image text-item body may not be feasible, since input tags may not be defined for a dynamically entered new item before the new item is filed into a content collection and the new item may not have any inserted images.

(iii) For a given similarity criterion, a relatedness (relevance) value between the new item and an existing content item may be measured using a comparison between term frequency vectors comprised of tf*idf weights of the new item and the existing content item. In other words, for each criterion, two associated term frequency vectors may be built, one for the new item and another for an existing content item. For example, a title-title criterion may generate two term frequency vectors—one for the new item, another for the existing item—where the set of terms (components or coordinates of each term frequency vector) may include all words (and possibly all bigrams) found in the title of the new item and the existing item. Coordinate values of the two vectors may be represented as tf*idf weights respectively for the new item and the existing item, where the term frequency multiplier tf may be calculated directly from the present text of the new item or the existing item, while the inverse document frequency multiplier idf may be defined within a corpus comprised of all existing items in the content collection plus the new item. For those terms that are present only in one of the two titles, the coordinate value corresponding to another vector may be set to zero. After the two vectors are built, a cosine similarity or other vector similarity measure between term frequency vectors built for the new item and the existing item may define relatedness between the new item and the existing content item.

(iv) After partial relatedness (relevance) values have been calculated for all similarity criteria, various multi-criteria optimization methods may be employed for defining a list of related items. In one embodiment, an overall measure of relevance of an existing content item with respect to a new item may be defined as a weighted sum of partial similarities, as explained elsewhere herein.

A list of related items with respect to such a weighted aggregation may be formed by cutting off content items having relevance values that fall below a predefined threshold; alternatively, the list may be built by choosing a pre-defined maximum number of related items, or by using other mechanisms.

The system may build and update sets of related content items (notes, documents, etc.) following user input. By the time a set of related items reflecting a previous state of user input has been created, the user might have entered more text, as explained elsewhere herein (see step 3 above). Subsequently, the set of related items may change as the user adds more text to the input. The system may employ various mechanisms for tracking stability of the set of related content items and may start displaying related items only when the set remains sufficiently stable, as explained elsewhere herein. The system may also postpone any display of related items until the user completes the input in case stabilization criteria are not met. Criteria for measuring stability of a set of related notes may include changes in the set, stabilization of similarity scores for particular content items, etc.

At a next phase (step 4 above), the system may use a combination of the new item and the related items to define a context for custom news streams. The system may extract and rank keywords, named entities and other context from a combination of the new and the existing related items and use a result thereof for filtering news feeds and other cloud-based or local news sources to construct custom news feed and offer the custom news feeds to the user. Various display techniques may be used to visualize related content items and custom news feeds; for example, a split pane with scrollable portions where one portion represents related items and another is for custom news items may be used. The user may scroll news items, view and choose from among the news items.

Upon selection of a portion of a news item, the user may be able to press a clipping button and selected content may immediately appear within quotes in the input item. The user may be able to set up a clipping option in such way that selected content appears at a current cursor position in the input item after a predefined timeout without otherwise actuating clipping (e.g., pressing any button). Alternatively, the user may be able to add selected content or add a whole news item to a content collection as a separate item or use one button to either insert segments in an existing item or add a new news item to the content collection. In this way, custom news streams and other external sources of information may serve as assistive materials and may be used directly in an authoring process to enhance newly created content.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for building and presenting to users custom news streams associated with a continuous textual user input. The system employs related notes retrieved from a content collection for the current input based on multi-criteria similarity and filters news streams based on a combined content of the current input and the set of related notes. The system may also support direct quoting of news items into a current item being entered by a user.

Figure 1:
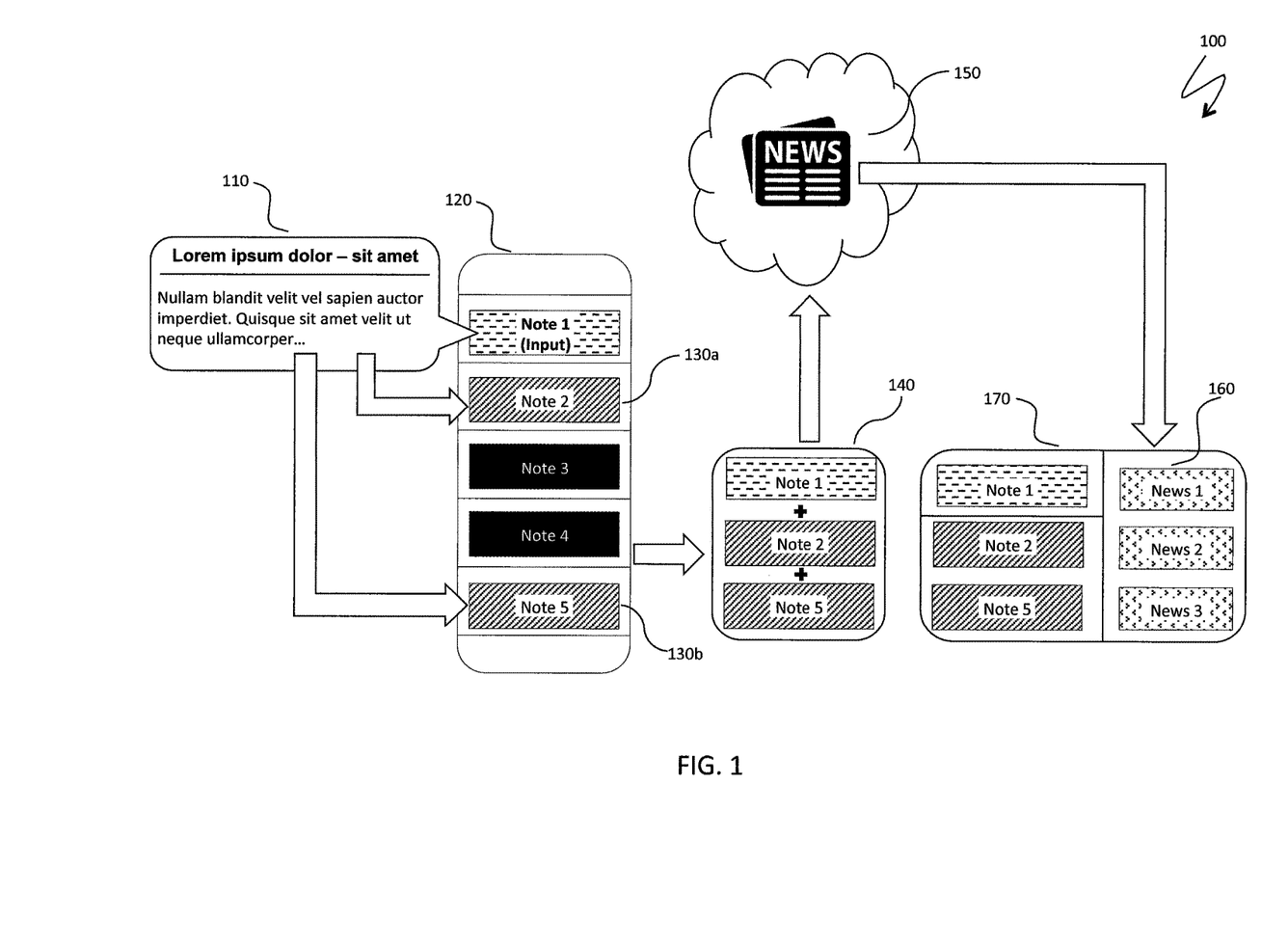
FIG. 1 is a schematic illustration of system architecture for contextual optimization of news streams and related notes, according to an embodiment of the system described herein.

FIG. 1 is a schematic illustration 100 of system architecture for contextual optimization of news streams. A new content item 110 being entered by a user is added into a content collection 120. The new content item 110 may be a document and the content collection 120 may be a collection of documents. The document may be a note and the collection of documents may be a notebook, such as a note/notebook system may be provided by Evernote Corporation of Redwood City Calif. or by the OneNote software offered by the Microsoft Corporation. Content of the new content item 110 is compared against existing content items in the collection 120 in search of related content items, as explained elsewhere herein. A resulting set of related items 130a, 130b is provided as input to a filter 140; construction of the filter 140 is explained elsewhere herein. The filter 140 is used to retrieve a portion of items from an external information source 150 (e.g., a news feed). A set of retrieved items 160 is presented within a structured display panel 170, as explained in more details elsewhere herein.

Figure 2:
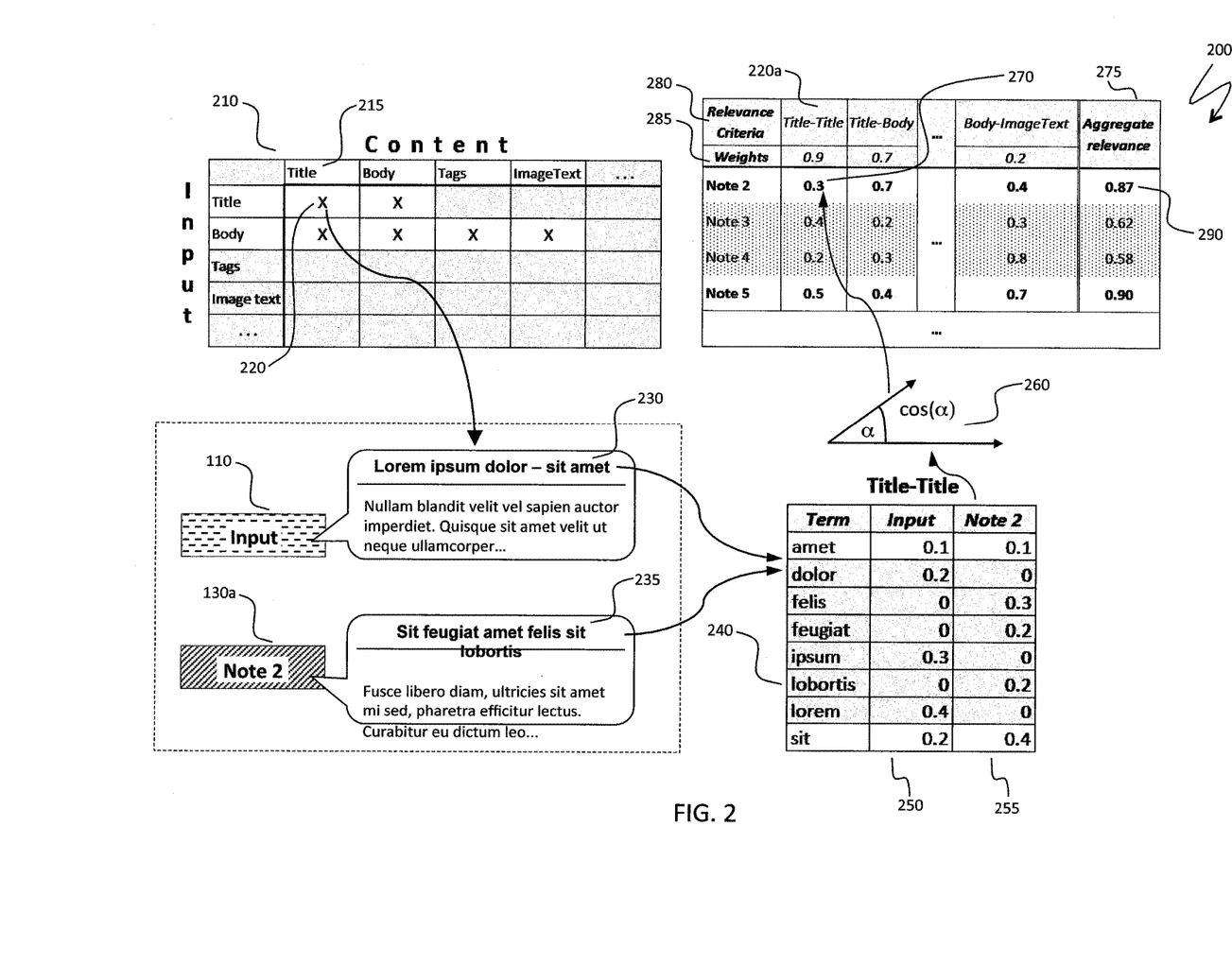
FIG. 2 schematically illustrates calculation of relevance scores, according to an embodiment of the system described herein.

FIG. 2 is a schematic illustration 200 of calculation of relevance scores. A two-dimensional criteria matrix 210 (explained elsewhere herein, see section (i) above) contains a list 215 of characteristics of content items in a content collection, such as an item title, body, tags, text extracted from embedded images, etc. Additional possible characteristics are described elsewhere herein. In FIG. 2, the list 215 of characteristics is reproduced symmetrically for matrix rows corresponding to a current input and matrix columns corresponding to existing (completed) content items in one or more content collections. Notwithstanding the symmetric arrangement, some of the characteristics may exist for either or both of the new content item 110 and the existing content. For example, in FIG. 2, rows corresponding to tags or image text are absent (shadowed depiction), while the columns corresponding to tags or image text are present (clear depiction). This corresponds to a scenario where the new content item 110 includes only text that may be split between a title and a body but does not possess tags and images, which may be added later to the new content item 110 or may be initially present in other content items, for example, when the other content items include material clipped from the web or from documents.

A particular similarity criterion 220, 220a chosen for illustration purpose in FIG. 2 is a title-title criterion that compares a similarity of titles of the new content item 110 and an existing content item 130a. For subsequent calculations, a title 230 of the new content item 110 and a title 235 of the content item 130a are selected. All terms present in the titles are arranged alphabetically in a column 240 and form the coordinate set of two tf*idf vectors 250, 255, where a first vector 250 corresponds to the new content item 110 and the second vector 255 reflects the existing content item 130a. Coordinates corresponding to the terms present in both titles 230, 235 are shown with white background and have non-zero coordinate values for both vectors, while coordinates corresponding to terms present only in one of the titles 230, 235 are shaded and a coordinate value for the other one of the titles 230, 235 is zero. Note that the term "sit" in the last row of the coordinate set has a $2x$ coordinate value for the content item corresponding to the content item compared with the new input; it is because the word "sit" appears two times in the title 235 of the existing content item 130a and only once in the title 230 of the new content item 110. After the vectors 250, 255 have been built, a similarity value between the new content item 110 and the existing content item 130a, or, equivalently, a degree of relatedness (relevance) of the content items 110, 130 at may be defined as a cosine similarity 260 between the two vectors 250, 255. A corresponding relevance value 270 may be entered into a relevance table 275 A first column of the table 275 indicates each particular content item; all other columns except the last column correspond to various relevance criteria 280. In an embodiment where a weighted sum of relevance values is used (as explained elsewhere herein), relevance criteria may be supplied with weights 285 and an aggregate relevance score 290 (the last column of the relevance table) may be calculated. Top scoring content items may be chosen, for example, by selecting all items with relevance values above a given threshold or by selecting a fixed number of top scoring items. In FIG. 1, the two content items 130a, 130b, shown with boldfaced aggregate relevance scores, have been included in the set of related items.

Figure 3:
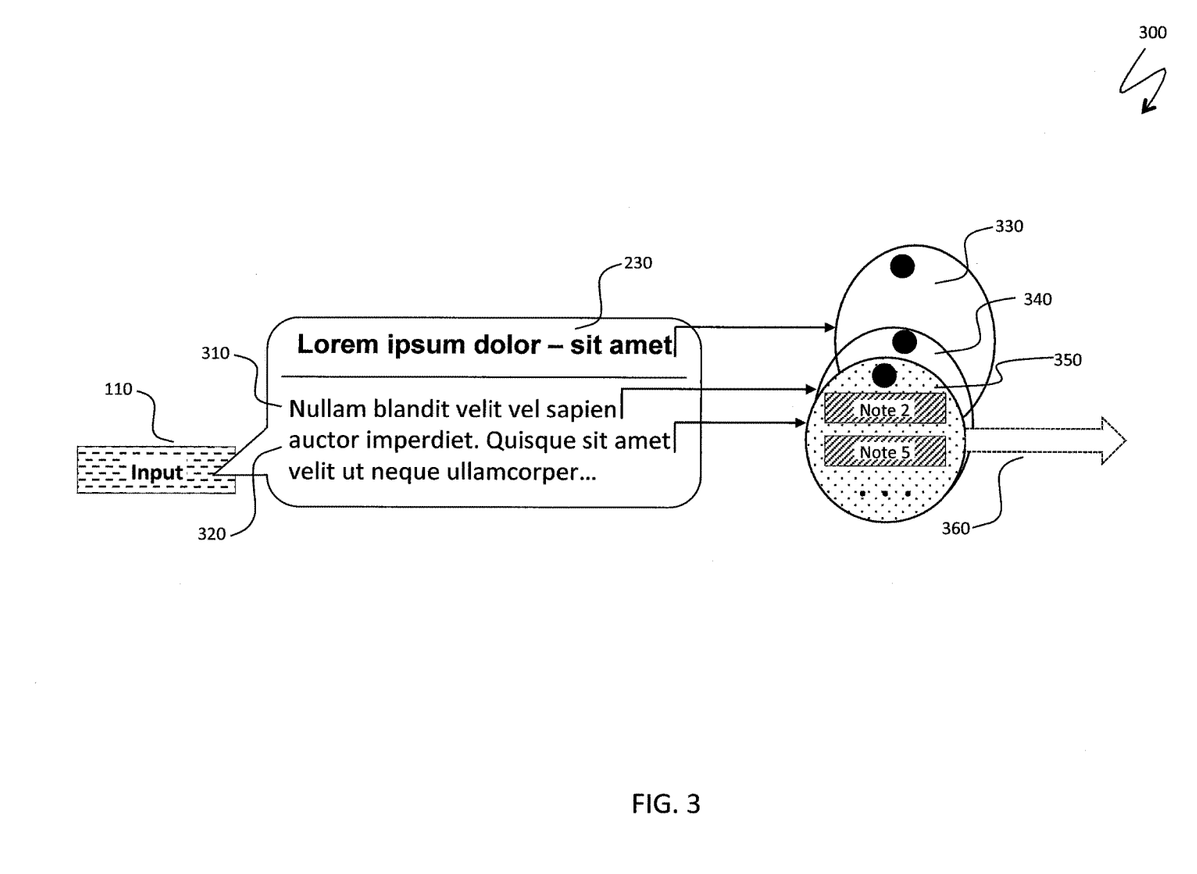
FIG. 3 is a schematic illustration of stabilization analysis for related items during input, according to an embodiment of the system described herein.

FIG. 3 is a schematic illustration 300 of stabilization analysis for related items during input. As the new content item 110 is entered, sets of related content items are modified as new fragments of text, such as the title 230, and text corresponding to a body 310, 320 of the new content item 110 are added to the new content item 110. Corresponding sets of related content items 330, 340, 350 may be compared, for example, by a difference in nomenclature included in the content items 330, 340, 350. When a change between adjacent sets of related notes becomes insignificant, such as in the case of the sets 340, 350, the system may start displaying a set of related notes and may conduct additional analysis of stabilization of relevance scores for displayed notes. The system may also start using stabilized set of related notes for other purposes (e.g., for the filter 140 in FIG. 1, discussed above), as illustrated by the arrow 360.

Figure 4:
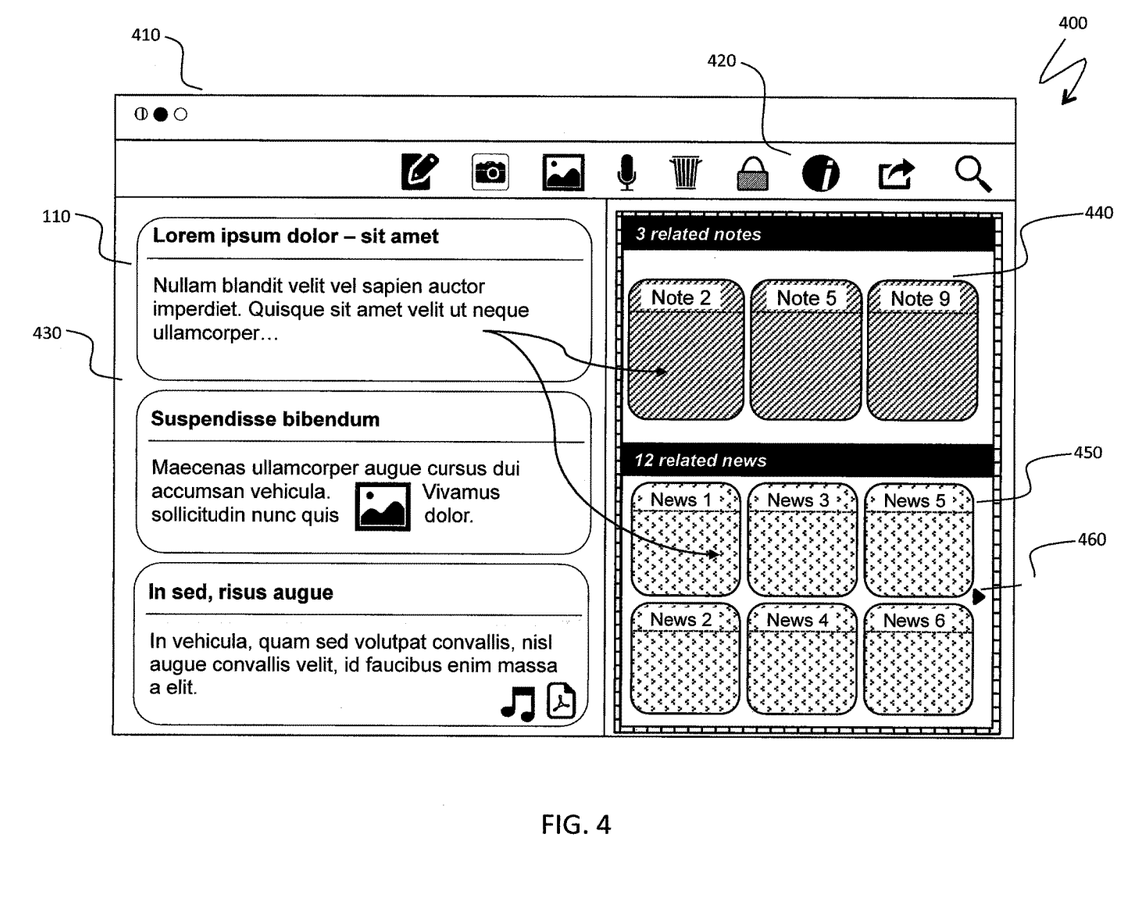
FIG. 4 is a schematic illustration of display of related and news items, according to an embodiment of the system described herein.

FIG. 4 is a schematic illustration 400 of display of related notes and news items. An application window 410 of a content management application has a toolbar 420. The application window 410 includes three panes: a pane 430 for content view, a pane 440 for related notes, and a pane 450 for custom streams of news and other external content offered through a filtering process, as explained elsewhere herein. The new content item 110 is provided in the pane 430 for content view and is shown as occupying a top position thereof indicating that the new content item is a currently active item. The pane 440 for related notes shows notes related to the currently active item. The news pane 450 does not fit all entities in the custom news stream and has a scrolling button 460; an analogous button would have appeared in the pane 440 if the pane 440 did not fit all related notes.

Figure 5:
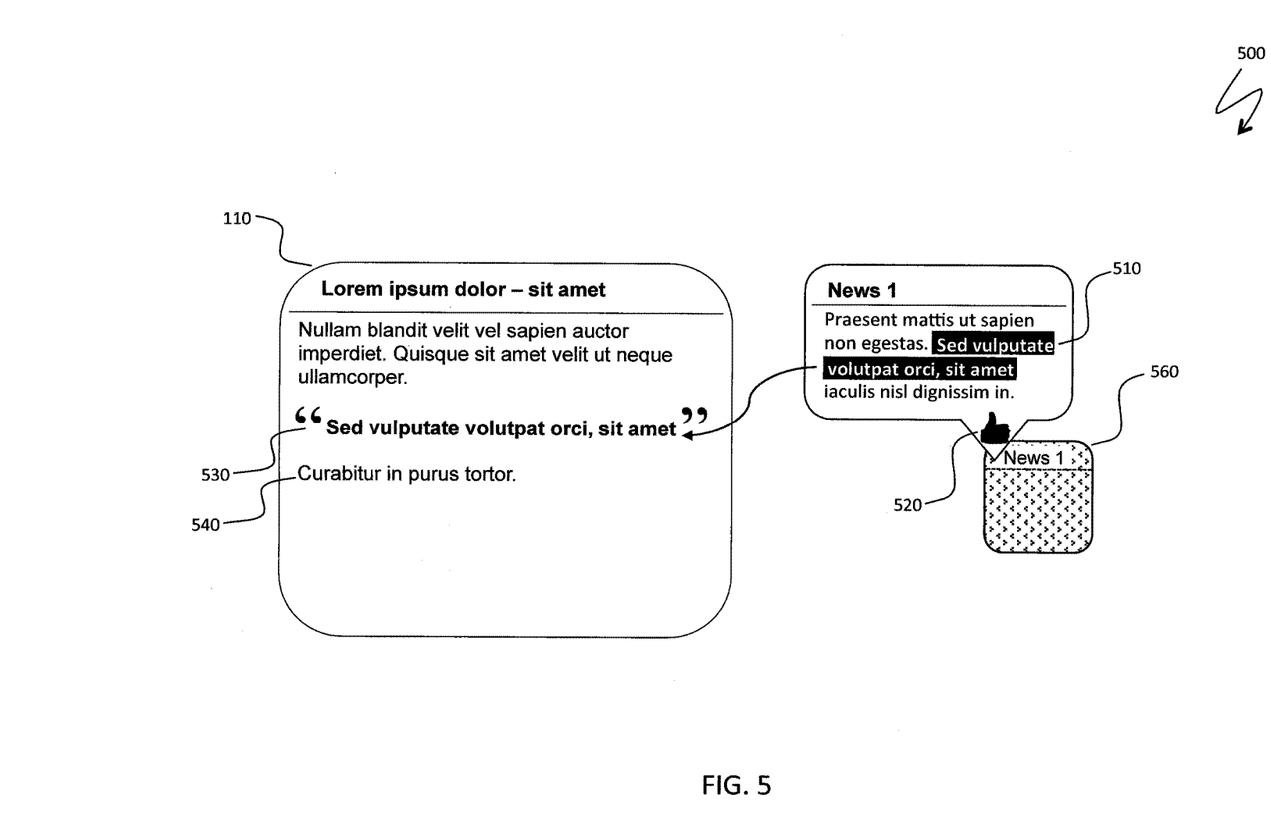
FIG. 5 is a schematic illustration of use of instant quotes from news items, according to an embodiment of the system described herein.

FIG. 5 is a schematic illustration 500 of use of instant quotes from news items. The new content item 110 being entered by the user is accompanied with a news item 560 selected from the set of retrieved items 160 (shown in FIG. 1). A user selects a portion 510 of text present in the news item 560 and may press a button 520 to make the selection 510 appear as quoted text 530 in the new content item 110. After that, the user may continue authoring the new content item 110 by entering additional text 540. As explained elsewhere herein, the button 520 is not necessarily the only option for entering quoted text. The button may be absent and the selection entered after a timeout following user selection (provided that the user has not clicked within the new item to cancel selection). Alternatively, the selection 510 may stay within the news item 560 until the user clicks or otherwise points within the new content item 110 to indicate an anchor place for the quoted text which will then appear at a corresponding position. Other mechanisms for directing the system to place a portion of a news item as quoted text within the new content item 110 may also be used.

Figure 6:
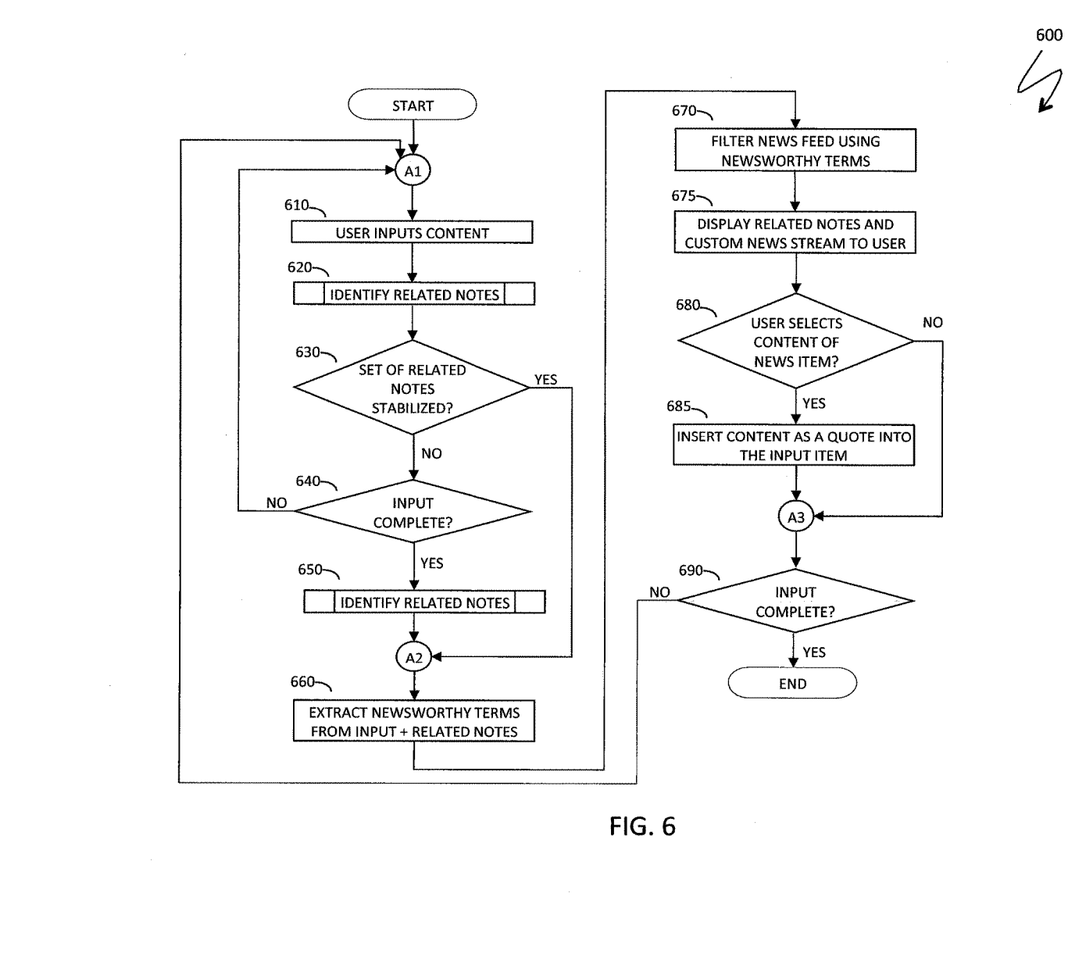
FIG. 6 is a system flow diagram illustrating system functioning for contextual optimization of news streams and related notes, according to an embodiment of the system described herein.

Referring to FIG. 6, a flow diagram 600 illustrates processing performed in connection with the system described herein. Processing starts at a step 610, where a user inputs content into a new content item, such as a note or a document. After the step 610, processing proceeds to a step 620, where the system identifies a set of related notes, as explained elsewhere herein. After the step 620, processing proceeds to a test step 630, where it is determined whether the set of related notes has stabilized, as explained elsewhere herein. If not, processing proceeds to a test step 640, where it is determined whether the user has completed the input. If so, processing proceeds to a step 650 where the system identifies related notes (for a completed input, since intermediate input conditions did not result in a stable set of related notes); otherwise, processing proceeds back to the step 610. After the step 650, processing proceeds to a step 660, where newsworthy terms such as keywords and named entities are extracted from the content item being entered by the user and a stable set of related notes. Note that the step 660 can be independently reached from the test step 630 if it was determined that the set of related notes has stabilized.

After the step 660, processing proceeds to a step 670, where the system accesses external information sources, such as news feeds, and filters news feeds using a filter created at the step 660, thus creating a custom stream of news entities or other external information related to the input, as explained elsewhere herein (see, for example, the filter 140 in FIG. 1 and the accompanying text). After the step 670, processing proceeds to a step 675, where the system displays related notes and a custom stream of external information, such as a news stream, to the user, as explained elsewhere herein (see, for example, the display 410 FIG. 4 for one possible display layout and control options). After the step 675, processing proceeds to a test step 680, where it is determined whether the user selects content of a news item for adding quoted text to the input, as explained elsewhere herein. If so, processing proceeds to a step 685, where the system inserts selected content as quoted text into the new content item being entered (see, for example, FIG. 5 and the accompanying text for details). After the step 685, processing proceeds to a test step 690, where it is determined whether the user has finalized entering information into the new content item. If so, processing is complete; otherwise, processing proceeds back to the step 610 for additional input. Note that the step 690 can be independently reached from the test step 680 if it was determined that the user does not select content of any news item for insertion as quoted text.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions.

Note that mobile device(s) capable of running the system described herein may include software that is pre-loaded with the device, installed from an application store, installed from media such as a CD, DVD, etc., and/or downloaded from a Web site. The mobile device may use an operating system such as iOS, Android OS, Windows Phone OS, Blackberry OS and mobile versions of Linux OS.

Software implementations of the system described herein may include executable code that is stored in a computer readable medium. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method, comprising:
receiving user input of content of a first document being entered by a user in an application;
while receiving the user input of the content of the first document, dynamically and in real time, identifying a set of relevant information items from a plurality of information feeds, including:
obtaining a set of one or more other documents in a collection of documents that are relevant to the first document being entered by the user, wherein the collection of documents is compiled by the user or shared among one or more groups to which the user belongs, and each document in the collection of documents was previously compiled by the user or the one or more groups;
determining, while receiving the user input, whether changes in member documents of the set of one or more other documents satisfies a stabilization criterion;
in accordance with the determination that the stabilization criterion is satisfied, extracting a set of related terms from the content of the first document and the one or more other documents;
constructing a filter based on the set of related terms extracted from the content of the first document and the one or more other documents; and
applying the filter to identify the set of relevant information items including the related terms from the plurality of information feeds; and
enabling presenting on a display the set of relevant information items.

2. The method, according to claim 1, wherein the first document is a note and the collection of documents is a notebook.

3. The method, according to claim 1, further comprising:
receiving a user selection of at least one information item of the set of relevant information items; and
identifying at least part of the at least one information item configured to be inserted into the first document.

4. The method, according to claim 1, wherein obtaining the one or more other documents that are relevant to the first document being entered by the user includes determining relevance values based on term frequency values and inverse document frequency values for characteristics of the one or more other documents and the first document being entered.

5. The method, according to claim 4, wherein the characteristics include at least one of: a title, a body portion, and a tag.

6. The method, according to claim 4, wherein relevance of each of the one or more other documents to the first document being entered by the user is a weighted sum of the relevance values for the characteristics of the respective other document.

7. The method, according to claim 1, wherein the collection of documents is one of: an individual collection and a shared collection.

8. The method, according to claim 1, wherein enabling presenting on the display the set of relevant information items further includes:
enabling display of a first pane showing content of the first document being entered by the user, a second pane showing the one or more other documents that are relevant to the first document being entered by the user, and a third pane showing the relevant information items identified from the plurality of information feeds.

9. The method, according to claim 8, wherein the one or more other documents are shown in the second pane after stabilization of relevance values of the one or more other documents.

10. The method, according to claim 9, wherein determining, while receiving the user input, whether changes in the member documents of the set of one or more other documents satisfies the stabilization criterion further comprises:
determining stabilization of the relevance values of the one or more other documents based on changes in the relevance values as the user enters additional text in the first document being entered by the user.

11. The method, according to claim 1, further comprising:
inserting data from the at least one of the relevant information items into the first document, including selecting text from a portion of the at least one of the relevant information items.

12. The method, according to claim 11, wherein, in response to a user action on a button, text that is selected from the portion of the at least one of the relevant information items is copied into the first document as quoted text.

13. The method, according to claim 11, wherein, after a predetermined amount of time, text that is selected from the portion of the at least one of the relevant information items is copied into the first document as quoted text without further user input.

14. The method of claim 1, wherein the plurality of information feeds include a plurality of news feeds, and the set of relevant information items include a plurality of news items.

15. A method of adding a new document to a collection of documents, comprising:
receiving user input of content of a first document being entered by a user in an application;
while receiving the user input of the content of the first document, dynamically and in real time, identifying a set of relevant information items from a plurality of information feeds, including:
obtaining one or more other documents in the collection of documents that are relevant to the first document being entered by the user that is independent of the new document, wherein the collection of documents is compiled by the user or shared among one or more groups to which the user belong, and each document in the collection of documents was previously compiled by the user or the one or more groups;
determining, while receiving the user input, whether changes in member documents of the set of one or more other documents satisfies a stabilization criterion;
in accordance with the determination that the stabilization criterion is satisfied, extracting a set of related terms from the content of the first document and the one or more other documents;
constructing a filter based on the set of related terms extracted from the content of the first document being entered by the user and on the one or more other documents; and
applying the filter to identify the set of relevant information items including the related terms from the plurality of information feeds; and
enabling presenting on a display the set of relevant information items, thereby allowing the user to select at least one of the relevant information items for insertion into the collection of documents as the new document.

16. A non-transitory computer-readable medium storing one or more programs, the one or more programs including instructions that when executed by a computer system cause the computer system to implement operations comprising:
receiving user input of content of a first document being entered by a user in an application;
while receiving the user input of the content of the first document, dynamically and in real time, identifying a set of relevant information items from a plurality of information feeds, including:
obtaining one or more other documents in a collection of documents that are relevant to the first document being entered by the user, wherein the collection of documents is compiled by the user or shared among one or more groups to which the user belong, and each document in the collection of documents was previously compiled by the user or the one or more groups;
determining, while receiving the user input, whether changes in member documents of the set of one or more other documents satisfies a stabilization criterion;
in accordance with the determination that the stabilization criterion is satisfied, extracting a set of related terms in the content of the first document and the one or more other documents;
constructing a filter based on the set of related terms identified in the content of the first document and the one or more other documents; and
applying the filter to retrieve the set of related terms and identify the set of relevant information items from the plurality of information feeds; and
enabling presenting on a display the set of relevant information items.

17. The non-transitory computer readable medium, according to claim 16, wherein the first document is a note and the collection of documents is a notebook.

18. The non-transitory computer readable medium, according to claim 17, the one or more programs further including instructions for:
receiving a user selection of at least one information item of the set of relevant information items; and
identifying at least part of the at least one information item configured to be inserted into the first document.

19. The non-transitory computer readable medium, according to claim 16, wherein obtaining the one or more other documents that are relevant to the first document being entered by the user includes determining relevance values based on term frequency values and inverse document frequency values for characteristics of the one or more other documents and the first document being entered.

20. The non-transitory computer readable medium, according to claim 19, wherein the characteristics include at least one of: a title, a body portion, and a tag.

21. The non-transitory computer readable medium, according to claim 19, wherein relevance of each of the one or more other documents to the first document being entered by the user is a weighted sum of the relevance values for the characteristics of the respective other document.

22. The non-transitory computer readable medium, according to claim 16, wherein the collection of documents is one of: an individual collection and a shared collection.

23. The non-transitory computer readable medium, according to claim 16, wherein the instructions for enabling presenting on the display the set of relevant information items further include:
instruction for enabling display of a first pane showing content of the first document being entered by the user, a second pane showing the one or more other documents that are relevant to the first document being entered by the user, and a third pane showing the relevant information items identified from the plurality of information feeds.

24. The non-transitory computer readable medium, according to claim 23, wherein the one or more other documents are shown in the second pane after stabilization of relevance values of the one or more other documents.

25. The non-transitory computer readable medium, according to claim 24, further comprising:
instructions for determining stabilization of the relevance values of the one or more other documents in accordance with a determination that changes in the relevance values become insignificant as the user enters additional text in the first document being entered by the user.

26. The non-transitory computer readable medium, according to claim 16, wherein executable code that inserts data from the at least one of the news items into the document inserts the data in response to the user selecting text from a portion of the at least one of the news items.

27. The non-transitory computer readable medium, according to claim 26, wherein, in response to a user action on a button, text that is selected from the portion of the at least one of the relevant information items is copied into the first document as quoted text.

28. The non-transitory computer readable medium, according to claim 26, wherein, after a predetermined amount of time, text that is selected from the portion of the at least one of the relevant information items is copied into the first document as quoted text without further user input.

29. The non-transitory computer readable medium of claim 16, wherein the plurality of information feeds include a plurality of news feeds, and the set of relevant information items include a plurality of news items.

30. A non-transitory computer readable medium storing one or more programs for adding a new document to a collection of documents, the one or more programs including instructions that when executed by a computer system cause the computer system to implement operations comprising:
receiving user input of content of a first document being entered by a user in an application;
while receiving the user input of the content of the first document, dynamically and in real time, identifying a set of relevant information items from a plurality of information feeds, including:
obtaining one or more other documents in the collection of documents that are relevant to the first document being entered by the user that is independent of the new document, wherein the collection of documents is compiled by the user or shared among one or more groups to which the user belong, and each document in the collection of documents was previously compiled by the user or the one or more groups;
determining, while receiving the user input, whether changes in member documents of the set of one or more other documents satisfies a stabilization criterion;

in accordance with the determination that the stabilization criterion is satisfied, extracting a set of related terms from the content of the first document and the one or more other documents;

constructing a filter based on the set of related terms extracted from the content of the first document being entered by the user and on the one or more other documents; and applying the filter to identify the set of relevant information items including the related terms from the plurality of information feeds; and enabling presenting on a display the set of relevant information items, thereby allowing the user to select at least one of the relevant information items for insertion into the collection of documents as the new document.

* * * * *

UNITED STATES PATENT AND TRADEMARK OFFICE
CERTIFICATE OF CORRECTION

PATENT NO. : 10,268,667 B1
APPLICATION NO. : 14/803175
DATED : April 23, 2019
INVENTOR(S) : Pachikov et al.

It is certified that error appears in the above-identified patent and that said Letters Patent is hereby corrected as shown below:

In the Claims

Claim 15, Column 12, Line 46, please delete "user belong, and" and insert --user belongs, and--;

Claim 16, Column 13, Line 17, please delete "user belong, and" and insert --user belongs, and--;

Claim 30, Column 14, Line 60, please delete "user belong, and" and insert --user belongs, and--.

Signed and Sealed this
Second Day of July, 2019

Andrei Iancu
*Director of the United States Patent and Trademark Office*